(12) United States Patent
Wu et al.

(10) Patent No.: US 10,212,220 B2
(45) Date of Patent: *Feb. 19, 2019

(54) SELF-ADAPTIVE CONTROL SYSTEM FOR DYNAMIC CAPACITY MANAGEMENT OF LATENCY-SENSITIVE APPLICATION SERVERS

(71) Applicant: Facebook, Inc., Menlo Park, CA (US)

(72) Inventors: Qiang Wu, Foster City, CA (US); Sanjeev Kumar, San Jose, CA (US); Sachin Kadloor, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/493,532

(22) Filed: Apr. 21, 2017

(65) Prior Publication Data

US 2017/0223100 A1    Aug. 3, 2017

Related U.S. Application Data

(63) Continuation of application No. 14/450,148, filed on Aug. 1, 2014, now Pat. No. 9,667,498.

(Continued)

(51) Int. Cl.
*G06F 9/50* (2006.01)
*H04L 12/24* (2006.01)
(Continued)

(52) U.S. Cl.
CPC ........ *H04L 67/1031* (2013.01); *G06F 9/5083* (2013.01); *H04L 41/0896* (2013.01);
(Continued)

(58) Field of Classification Search
None
See application file for complete search history.

(56) References Cited

U.S. PATENT DOCUMENTS 9,667,498 B2   5/2017  Kadloor et al.
2010/0050171 A1  2/2010  Liang et al.
(Continued)

OTHER PUBLICATIONS

Advisory Action dated Nov. 23, 2016 of U.S. Appl. No. 14/450,148 by Wu, Q., et al., filed Aug. 1, 2014.
(Continued)

*Primary Examiner* — Kevin T Bates
*Assistant Examiner* — Lesa M Kennedy
(74) *Attorney, Agent, or Firm* — FisherBroyles, LLP

(57) ABSTRACT

A self-adaptive control system based on proportional-integral (PI) control theory for dynamic capacity management of latency-sensitive application servers (e.g., application servers associated with a social networking application) are disclosed. A centralized controller of the system can adapt to changes in request rates, changes in application and/or system behaviors, underlying hardware upgrades, etc., by scaling the capacity of a cluster up or down so that just the right amount of capacity is maintained at any time. The centralized controller uses information relating to a current state of the cluster and historical information relating to past state of the cluster to predict a future state of the cluster and use that prediction to determine whether to scale up or scale down the current capacity to reduce latency and maximize energy savings. A load balancing system can then distribute traffic among the servers in the cluster using any load balancing methods.

17 Claims, 11 Drawing Sheets

Related U.S. Application Data

(60) Provisional application No. 61/919,363, filed on Dec. 20, 2013.

(51) Int. Cl.
*H04L 12/26* (2006.01)
*H04L 29/08* (2006.01)
*H04L 12/911* (2013.01)

(52) U.S. Cl.
CPC .......... *H04L 43/08* (2013.01); *H04L 43/0817* (2013.01); *H04L 47/726* (2013.01)

(56) References Cited

U.S. PATENT DOCUMENTS

| | | |
|---|---|---|
| 2011/0208875 A1 | 8/2011 | Hasson et al. |
| 2014/0059367 A1 | 2/2014 | Chan et al. |
| 2015/0180719 A1 | 6/2015 | Wu et al. |

OTHER PUBLICATIONS

Final Office Action dated Aug. 30, 2016 of U.S. Appl. No. 14/450,148 by Wu, Q., et al., filed Aug. 1, 2014.
Non-Final Office Action dated Mar. 21, 2016 of U.S. Appl. No. 14/450,148 by Wu, Q., et al., filed Aug. 1, 2014.
Notice of Allowance dated Mar. 22, 2017 of U.S. Appl. No. 14/450,148 by Wu, Q., et al., filed Aug. 1, 2014.
U.S. Appl. No. 14/450,148 by Wu, Q. et al., filed Aug. 1, 2014.

SELF-ADAPTIVE CONTROL SYSTEM FOR DYNAMIC CAPACITY MANAGEMENT OF LATENCY-SENSITIVE APPLICATION SERVERS

CROSS-REFERENCE TO RELATED APPLICATION(S)

This application is a continuation of U.S. patent application Ser. No. 14/450,148, entitled A SELF-ADAPTIVE CONTROL SYSTEM FOR DYNAMIC CAPACITY MANAGEMENT OF LATENCY-SENSITIVE APPLICATION SERVERS, filed on Aug. 1, 2014, which claims the benefit of U.S. Provisional Patent Application Ser. No. 61/919,363, entitled "UTILIZATION INFORMATION-BASED POWER SAVING MECHANISMS FOR DATA CENTERS," filed on Dec. 20, 2013, both of which are incorporated herein by reference in its entirety.

BACKGROUND

Server clusters comprising a group of linked servers generally employ load balancing methods for workload management with the goal of reducing response times and thereby improving performance. A load balancing method improves the performance of a server cluster by distributing requests initiated from clients among available servers in the cluster. Various load balancing methods are known in the prior art for improving the performance of a server cluster. For example, the round robin load balancing method passes each request from a client to the next server in the cluster, eventually distributing requests evenly among all the servers. Similarly, the least usage load balancing method balances load among the servers in the cluster by tracking the utilization per server and directing new requests to servers with the least utilization. While load balancing methods generally improve the performance of a server cluster, they do not address the need for power and energy conservation in server clusters. As energy costs for data centers continue to rise, technology for optimizing both energy and performance metrics of server clusters is needed.

DETAILED DESCRIPTION

Figure 1:
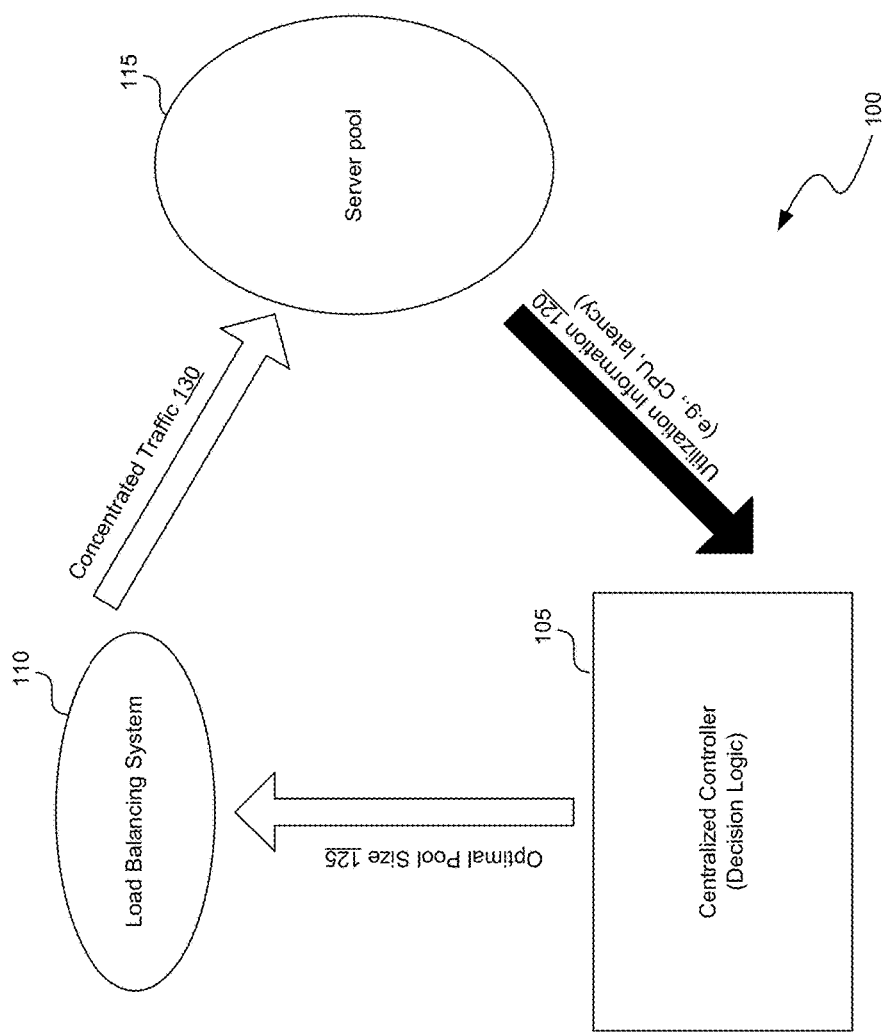
FIG. 1 is a block diagram illustrating an architecture of an example server cluster implementing a self-adaptive control system including a centralized controller for dynamic server capacity management for performance and power optimization in the server cluster.

Web applications, such as social networking applications, are very sensitive to server latency or response time. Enough server capacity is therefore needed to guarantee good response times, particularly during peak hours, so as not to impact user experience. Typically, data center operators provision a fixed number of servers per cluster to meet the estimated peak workload. However, most web applications also have time-varying workloads, with daily workload cycles affected by user access patterns. As a result, many of the servers in the cluster operate at medium to high CPU utilization for only about 20-30% of the time on average. During the rest of time, many of the servers operate at low CPU utilization. However, low CPU utilization is very inefficient. For example, a particular type of server can consume about 60 W of power when it is idle (i.e., with 0 requests per second (RPS)). However, the power consumption jumps up to about 130 W when it runs at low CPU utilization (with small RPS). When the server runs at medium to high CPU utilization, it consumes only slightly more power at about 150 W (with medium-level RPS). Therefore, the average sever utilization for a cluster with a fixed number of servers can be low, resulting in wasted power. Furthermore, from a power efficiency perspective, it is preferable to avoid running a server at low CPU utilization.

Dynamic capacity management, which seeks to match the number of active servers to the current level of workload, can reduce some of the wasted power and thereby increase the efficiency of a data center. Existing dynamic capacity management techniques, however, are based on heuristics which rely on empirical evaluation and manual tuning to try to estimate or predict the change of request rate (e.g., RPS) or workload. These techniques usually work well for applications that are relatively static. However, for web applications like social networking applications, the application behavior and systems are dynamically evolving. For example, some social networking applications can do code push multiple times a day. Similarly, the underlying system or hardware can be upgraded from time to time. These changes can alter the response times and CPU utilization characteristics of servers. For such applications with dynamic behavior, a self-adaptive control technology is needed in order to manage the server capacity more effectively. The dynamic capacity management technology disclosed herein utilizes classic control theory to adapt efficiently to continuous changes of request rates, and application and system behaviors to scale cluster capacity, allocating or deallocating servers to accept request traffic as needed. The disclosed technology works effectively for server clusters of various sizes including very large scale server clusters.

The self-adaptive control system includes a centralized controller that uses current information relating to an operating parameter (e.g., latency, CPU utilization, request queue) aggregated from a number of active servers in a cluster and historical information relating to the operating parameter to predict a change in workload and determine an optimal number of active servers needed to handle the change in workload efficiently while reducing latency and maximizing energy savings. Based on the optimal number of active servers, the self-adaptive control system can scale up or down the server capacity to obtain energy and power savings. A load balancing system can then distribute traffic among the active servers using any load balancing methods (e.g., round-robin, weighted round-robin, random). Thus, the centralized controller deployed in a cluster continuously maintains just the right amount of server capacity in the cluster to adapt to time-varying workloads (e.g., workload surges or drops) and changing application and system behaviors (e.g., caused by software or hardware changes), and in doing so, optimizes both the latency and efficiency characteristics of the cluster.

Various implementations of the self-adaptive control system, including methods for determining an optimal number of active servers for processing varying workloads while optimizing power consumption and latency characteristics of a server cluster will now be described. The following description provides specific details for a thorough understanding and an enabling description of these implementations. One skilled in the art will understand, however, that the disclosed system and methods may be practiced without many of these details. Additionally, some well-known structures or functions may not be shown or described in detail, so as to avoid unnecessarily obscuring the relevant description of the various implementations. The terminology used in the description presented below is intended to be interpreted in its broadest reasonable manner, even though it is being used in conjunction with a detailed description of certain specific implementations of the disclosed system and methods.

FIG. 1 is a block diagram illustrating an architecture of an example server cluster implementing a self-adaptive control system including a centralized controller for dynamic server capacity management for performance and power optimization in the server cluster. A core component of the architecture of the self-adaptive control system 100 is a centralized controller 105 that implements the decision logic. The centralized controller 105 can be an add-on to a typical load balancing system 110 which directs traffic to a pool of web servers 115. In some embodiments, the centralized controller 105 can be implemented within the load balancing system 110. In other embodiments, the centralized controller 105 can be implemented as a separate component that communicates with the load balancing system 110.

The server pool 115 represents a server cluster and include a number of servers (e.g., application servers or web servers) that can be classified into active servers which take traffic and inactive servers which do not. The load balancing system 110 sends request traffic to all active servers in the server pool 115. The centralized controller 105 forms a feedback control loop that starts by collecting utilization information 120 (e.g., latency, CPU utilization, request queue) from all active servers in the server pool 115. The collected information is used as a feedback signal and fed to the centralized controller 105. The centralized controller 105 then makes a decision on the optimal active pool size 125 and passes the decision to the load balancing system 110. As a result of the decision, the number of active servers in the server pool 115 is scaled up or down to match the optimal active pool size. The load balancing system 110 then sends traffic 130 to the server pool 115, concentrating the traffic to only the active servers in the server pool 115.

Figure 2:
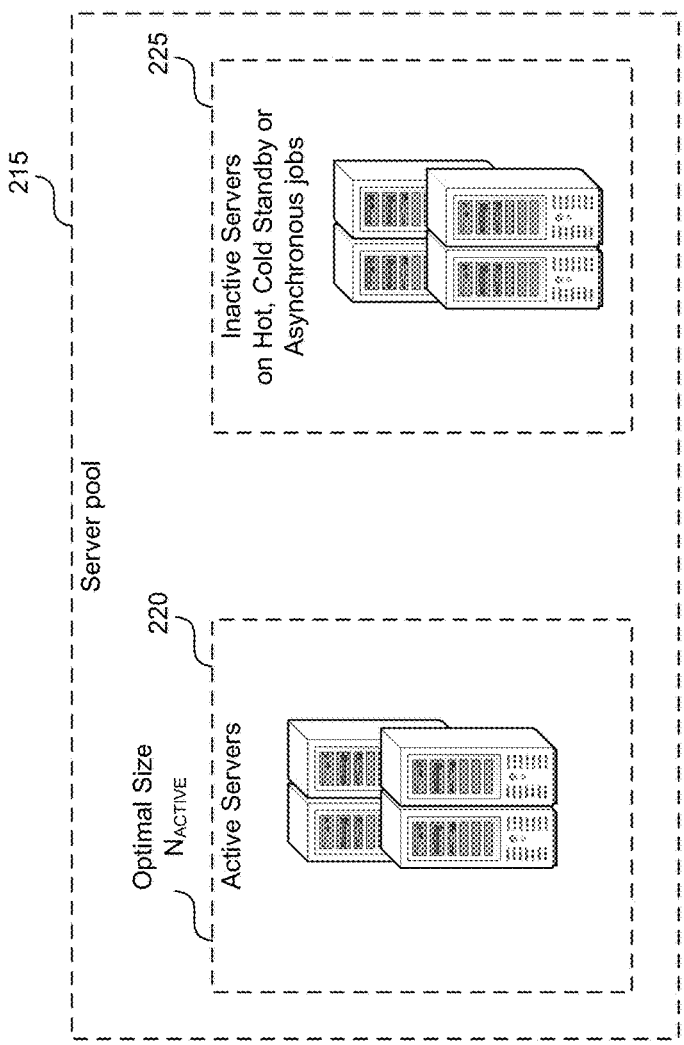
FIG. 2 is a block diagram illustrating active and inactive servers in a server pool in accordance with a first embodiment.

FIG. 2 is a block diagram illustrating active and inactive servers in a server pool in accordance with a first embodiment. The server pool 215 can include a group of active servers 220 and a group of inactive servers 225. The optimal size of the active server pool ($N_{ACTIVE}$) is determined by the centralized controller 105 of FIG. 1. The rest of the servers in the pool of servers 215 are inactive servers 225 that can be placed on hot standby (e.g., idle state), cold standby (e.g., turned off, powered down, for example, by switching to sleep mode) or loaned out to other applications for asynchronous jobs.

At idle, the operating system can do very efficient power optimization. So, by concentrating traffic to only the active servers and leaving the inactive servers on hot standby, significant energy savings can be achieved. For example, as described before, a typical type of server consumes about 60 W of power when it is completely idle. It would consume about 130 W when it runs at low CPU utilization and only slightly more power (~150 W) when it runs at medium CPU utilization. Therefore, it is more power efficient to run one server at, for example, 40% and one at idle (or in deep sleep mode, powered off or repurposed to run asynchronous jobs), as opposed to running both servers at 20% utilization. It should be noted that in various embodiments, various measurement thresholds or ranges can be established for low, medium and high CPU utilizations.

Placing the inactive servers into deep sleep mode or even turning them off (cold standby) would give more energy savings as compared to placing the inactive servers in hot standby. However, compared to hot standby servers which can wake up instantaneously, the cold standby servers can take some time to completely wake up. Using the inactive servers for latency non-sensitive applications (asynchronous workers) such as video encoding, data processing and mining can also provide energy savings. Similar to the cold standby, this may involve a time delay before these servers can be switched back to the active mode to accept traffic.

Figure 3:
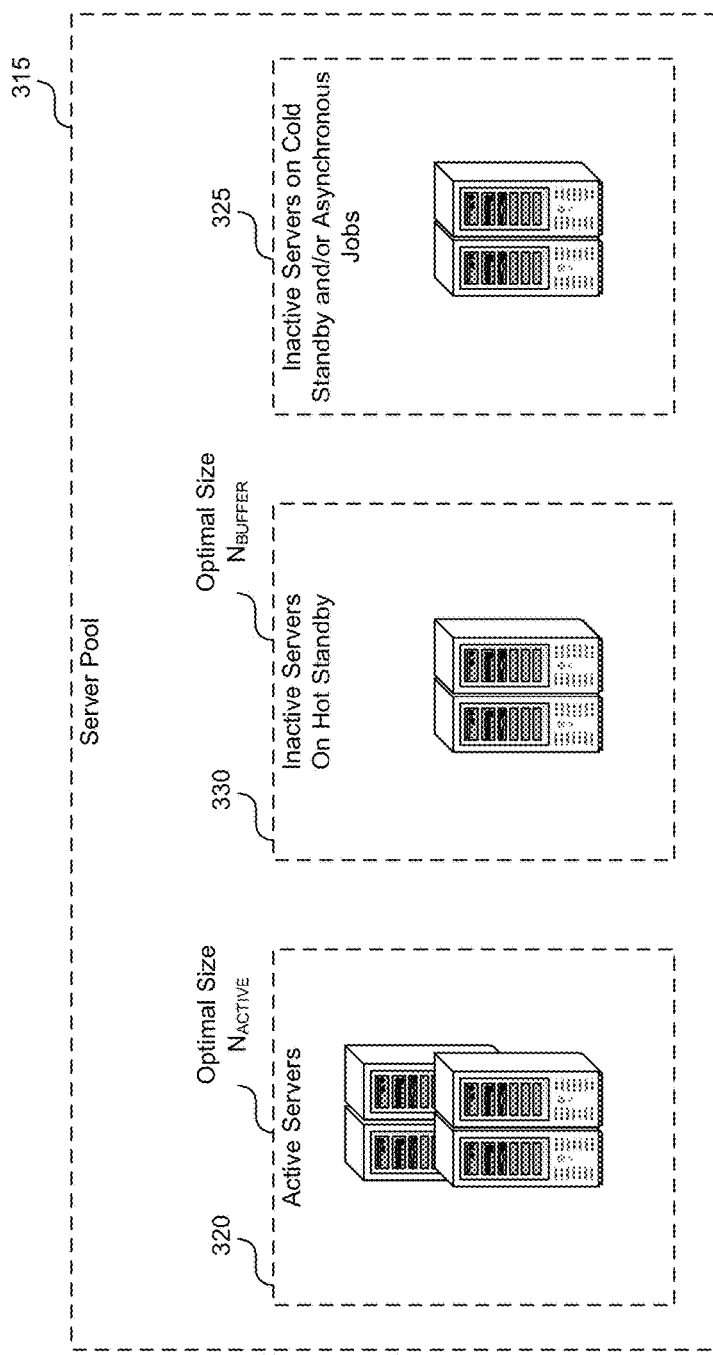
FIG. 3 is a block diagram illustrating active and inactive servers in a server pool in accordance with a second embodiment.

As described above, placing all the inactive servers in cold standby provides the most energy savings. However, due to the set up time involved in bringing the servers in cold standby to an active mode, the self-adaptive control system may not adapt as fast when unexpected events cause a surge in workload in the cluster. Similarly, while keeping all inactive servers in hot standby is the most performance conscious approach to minimize the set up time to bring a server from an inactive state to an active state to take traffic, it also means less energy savings. If some of the inactive servers are placed in either cold standby or loaned out as asynchronous workers, a buffer of hot standby servers can be kept to account for the possible wake-up delay and achieve some energy savings as illustrated in FIG. 3. In FIG. 3, the server pool 315 can include a group of active servers 320 of optimal size $N_{ACTIVE}$, a group of inactive servers 330 on hot standby and a group of inactive servers 325 on cold standby or asynchronous jobs. The group of inactive servers 330 on hot standby act as a buffer that enables the cluster to scale its capacity rapidly when needed. The buffer can be an elastic buffer with an optimal size, $N_{BUFFER}$, decided by the centralized controller 105 of FIG. 1 based on the current trend of workload change.

Figure 4:
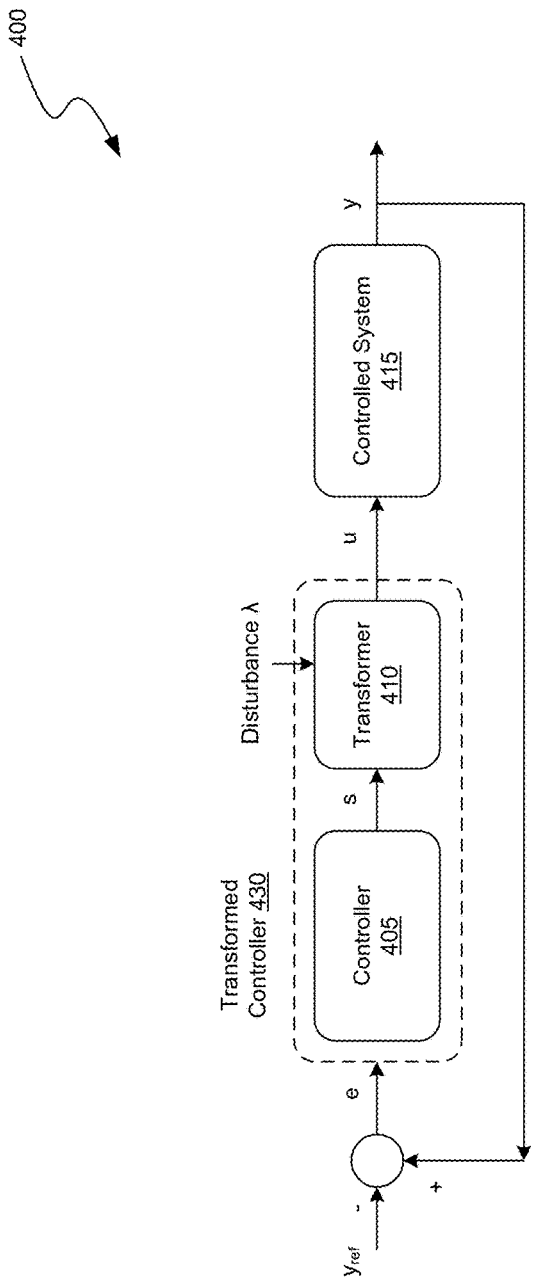
FIG. 4 is a block diagram illustrating a self-adaptive control system for dynamic server capacity management for performance and power optimization in a server cluster.

FIG. 4 is a block diagram illustrating a self-adaptive control system for dynamic server capacity management for performance and power optimization in a server cluster.

The self-adaptive control system 400 is a closed loop feedback control system that uses a feedback loop to determine an optimal number of active servers necessary to adapt to the varying workload, application and system behavior changes, while maximizing energy savings or efficiency gain opportunity and avoiding overconcentration of traffic in a way that could affect the response time and impact user experience.

The self-adaptive control system 400 includes a transformed controller 430 (e.g., the centralized controller 105, 505, 605) having a controller 405 and a controlled system 415. The controlled system 415 is an active server in the cluster. In order to design the controller 405, the dynamics of the control system 415 is first modeled to determine the relationship between the measured process variable (y) and the control variable (u). In FIG. 4, the output y can either be a latency or a proxy like CPU utilization. The transformed (external) control signal u is the normalized percentage change in per-server request per second (RPS). The internal control signal (s) is the reverse of percentage change in active server pool size. Since both u and s are normalized, the transformation function is really an identity function. The disturbance input (λ) accounts for all un-measureable workload or application changes. The error signal (e) is the control error and provides a difference between the measured variable (y) and a reference (or target or set point) ($y_{ref}$) to which the measured variable should converge to.

Figure 8:
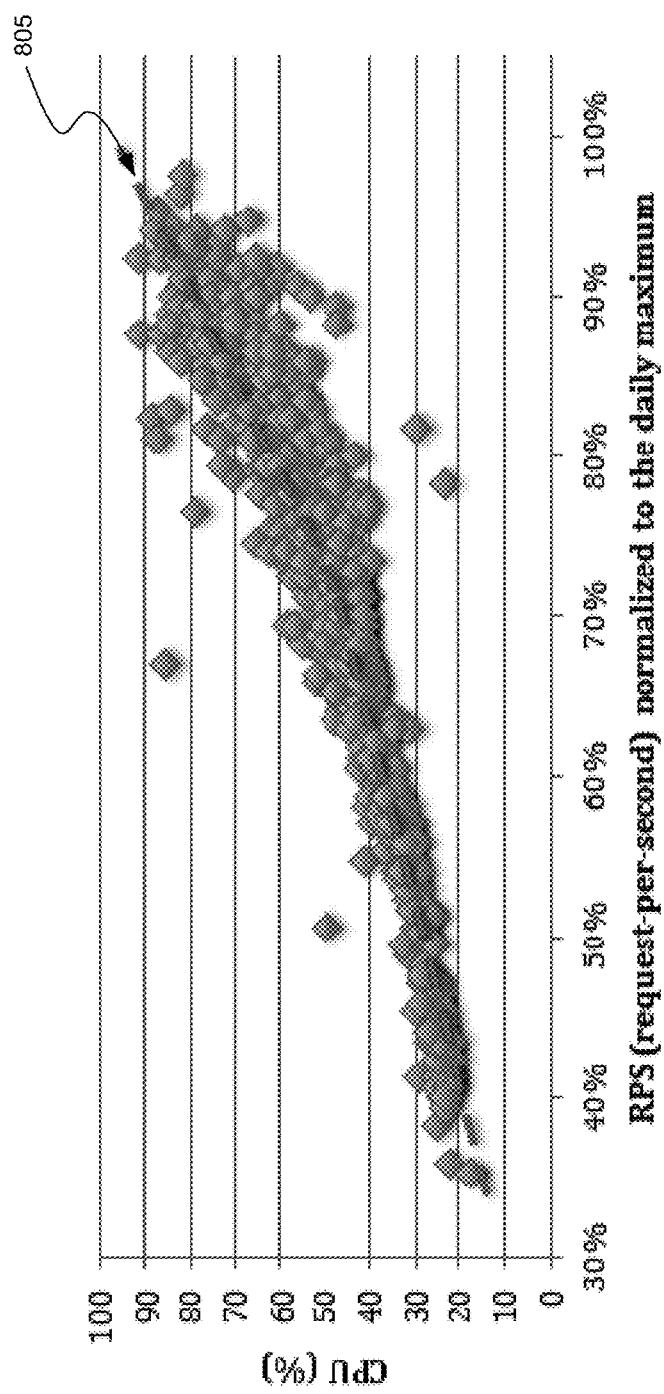
FIG. 8 is a graphical diagram plotting a measured variable against a controlled variable for a server-type to model the relationship between the measured variable and the controlled variable for the server-type.

The controlled system 415 can be modeled by determining the relationship between the measured variable y and control signal u. The correlation between the measured variable y and the control signal u can be inferred or estimated from empirical data collected from the cluster. For example, the graphical diagram of FIG. 8 can be generated by plotting the measured variable (CPU utilization y) against the controlled variable (RPS u) for one type of server to model the relationship between the measured variable and the controlled variable for that server type. From FIG. 8, the line 805 shows the estimated piece-wise linear model of the controlled system 415 and can be expressed by equation (1) below.

$$y = h*x + c \quad (1)$$

In equation (1), x is normalized RPS, y is CPU utilization, h is a slope of the linear model and c is a constant. The parameter h can be estimated by the controller 405 through a self-tuning process. Taking derivatives on both sides of equation (1), the linear model of the controlled system 415 in discrete format is:

$$y_{k+1} = y_k + h*u_k \quad (2)$$

In equation (2), the CPU utilization at $k+1^{th}$ control period depends on the CPU utilization and request rate at $k^{th}$ control period. Once the controlled system 415 is modeled, the controller 405 can be designed. In this example, the controller 405 is based on PI (Proportional-Integral) theory. In other embodiments, the controller 405 can be designed as a P (Proportional) controller or PID (Proportional Integral Differentiator) controller. The following state equations can be used to define a discrete-time PI controller 405:

$$y_{k+1} = y_k + h*u_k \quad (2)$$

$$e_{k+1} = y_{k+1} - y_{ref} \quad (3)$$

$$u_{k+1} = u_k + K_p*(e_{k+1} - e_k) + K_i*e_{k+1} \quad (4)$$

In equation (4), $K_i$ and $K_p$ are the control gains for the PI controller 405.

Based on equation (4), a control signal to be applied to the controlled system is thus a sum of the previous control signal, a P-term which is proportional to the error and an I-term which is proportional to the integral of the error. Using the root locus and stability analysis from the control theory, or any other suitable techniques known in the art, control parameters values ($K_i$ and $K_p$) can be selected to meet certain design constraints (e.g., fast response time, no oscillation). One example set of control parameters can be:

$$K_i = K_p = \frac{1}{h} \quad (5)$$

Figure 5:
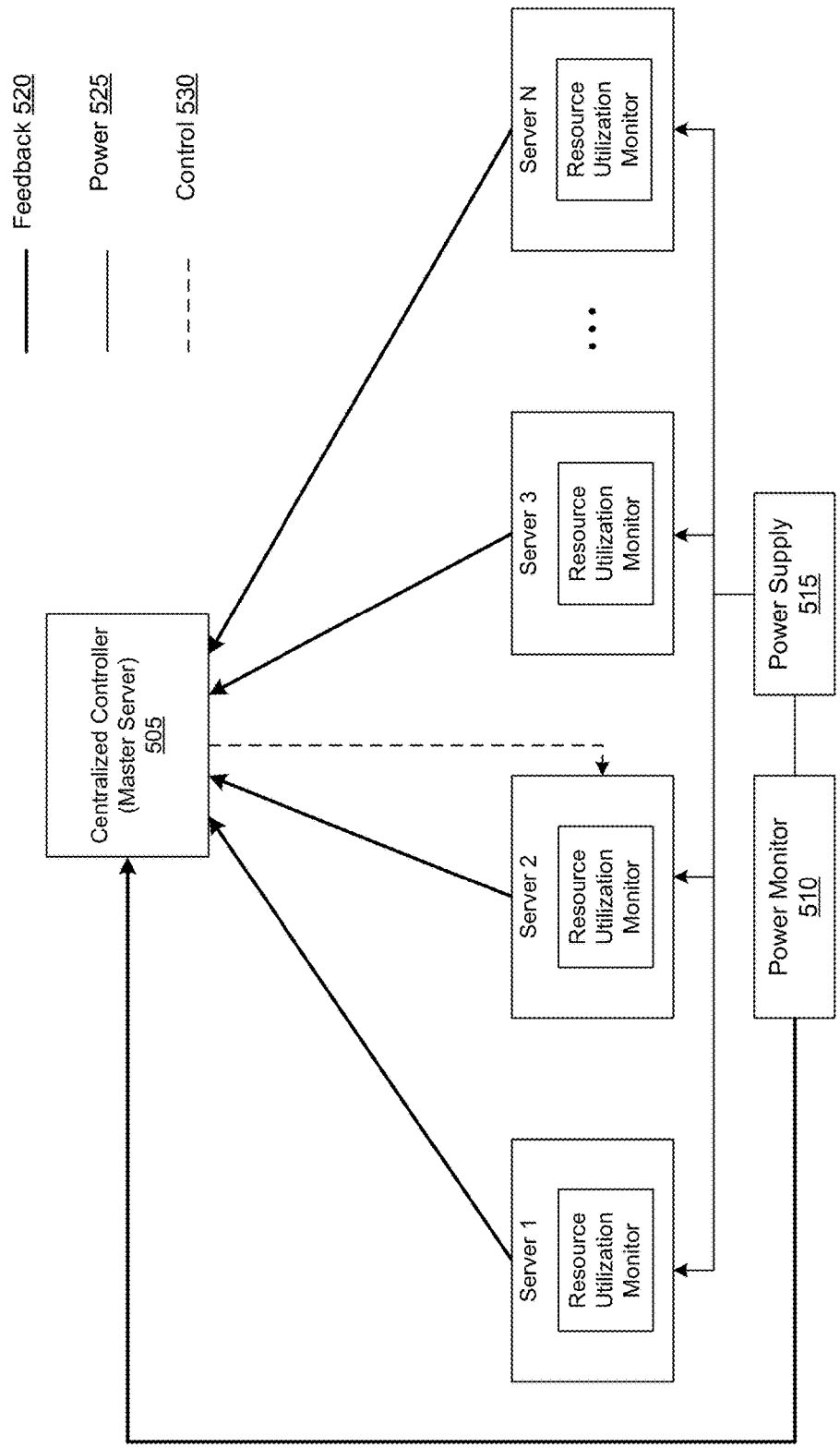
FIG. 5 is a block diagram illustrating aggregation of resource utilization information from active servers in a server cluster by a centralized controller of a self-adaptive control system for dynamic server capacity management.

FIG. 5 is a block diagram illustrating aggregation of resource utilization information from active servers in a server cluster by a centralized controller of a self-adaptive control system for dynamic server capacity management.

In some embodiments, the centralized controller 505 can be implemented on a master server (server 0 or node 0) that is like any other servers or nodes 1-N in the cluster. The master server, however, may not be turned off and can periodically query any of the active servers among the 1-N servers in the cluster for resource utilization information. Each of the servers 1-N can have a resource utilization monitor to measure one or more operating parameters, for example, CPU utilization, latency or response time, disk utilization, network utilization and/or the like. In some embodiments, a power monitor 510 (e.g., a power meter) can be included to measure power drawn by the servers 1-N in the cluster from the power supply 515. In some embodiments, the centralized controller 505 can be implemented on a dedicated machine to manage the servers 1-N in the cluster.

In some embodiments, instead of querying the servers, the centralized controller 505 can receive periodic reports including resource utilization information from the active servers in the cluster. In FIG. 5, the resource utilization information from the resource utilization monitors of the active servers in the cluster and average power consumption by the servers in the cluster are examples of feedback 520 collected by the centralized controller 505. The power 525 is drawn by the servers 1-N from the power supply 515 and can be used to determine the efficiency of the cluster during a time period. The centralized controller 505 uses the feedback and control theory (e.g., PI or PID control theory described with reference to FIG. 4) to determine how many servers to turn up or activate and sends a control signal 530 to turn up or turn down one or more servers in the cluster.

Figure 6:
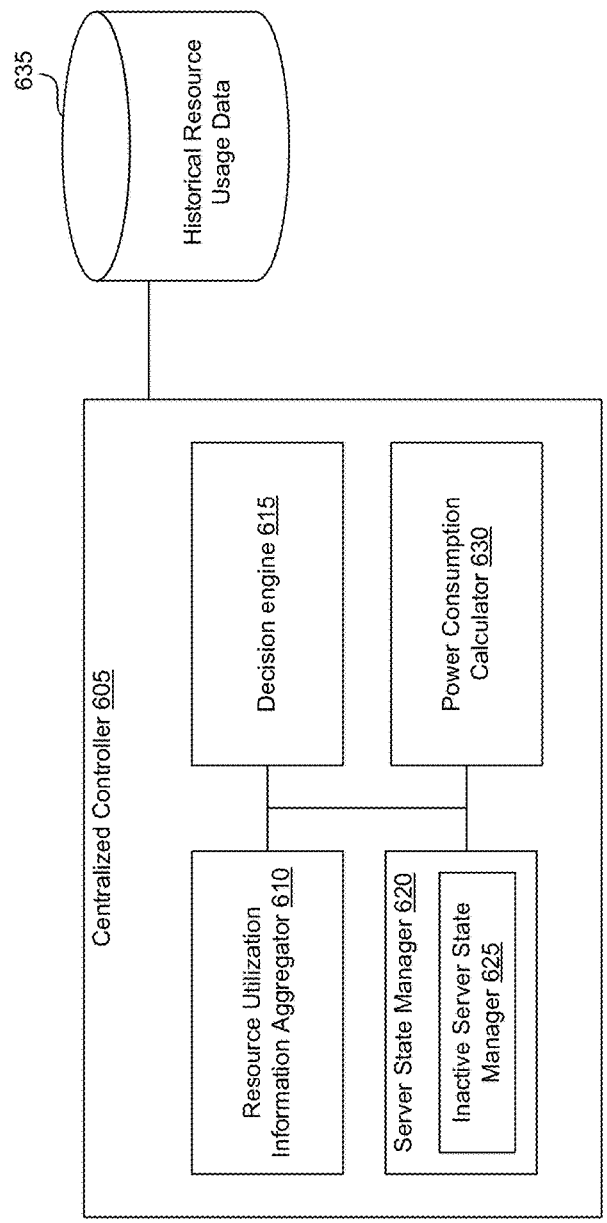
FIG. 6 is a block diagram illustrating example components of a centralized controller of a self-adaptive control system for dynamic server capacity management.

FIG. 6 is a block diagram illustrating example components of a centralized controller of a self-adaptive control system for dynamic server capacity management.

The centralized controller 605 implements the decision logic or algorithm based on control theory. The centralized controller 605 is implemented either on a dedicated machine (e.g., a dedicated server) or one of the servers in the cluster. The centralized controller 605 can include a resource utilization information aggregator 610, a decision engine 615, a server state manager 620 having an inactive server state manager 625 and a power consumption calculator 630. More or less components may be present in other embodiments of the centralized controller 605.

The resource utilization information aggregator 610 can aggregate resource utilization information from the active servers in a cluster. In some embodiments, the resource utilization information aggregator 610 can query each active server in the cluster for resource utilization information. Alternatively, in other embodiments, the resource utilization information aggregator 610 can receive periodic reports including resource utilization information from each active server in the cluster. The resource utilization information collected by the resource utilization information aggregator can include, for example, request rates, CPU utilization, power consumption, latency, disk utilization, network utilization or any other metric measured by each active server. The resource utilization information can also include total power consumption measured by a power meter (e.g., power meter 510 of FIG. 5).

The decision engine 615 implements a control algorithm based on the self-adaptive control system as described in detail with respect to FIG. 4. The decision engine 615 utilizes the resource utilization information from the active servers in the cluster and historical information to predict a future state of the system and use that prediction to determine whether to turn up more servers or turn down more servers to maximize energy savings and minimize latency in the cluster. For example, consider an example cluster with 20 active servers (i.e., current capacity is 20). In the beginning of each control cycle, the decision engine 615 can collect CPU utilization information from all 20 active servers to determine the average CPU utilization. In this example, suppose the average CPU utilization is 40% (i.e., y=40%) and the target average CPU utilization to be 50% (i.e., $y_{ref}$=50%). Based on equation (3) of the discrete time PI controller, the decision engine 615 can determine the error signal in the current control cycle between the current CPU utilization and target CPU utilization to be negative 10% (i.e., $e_{k+1}$=40%−50%=−10%). Using equation (4) and using the percent change in request per second per server ($u_k$) and the error signal ($e_k$) in the last control cycle, the error signal ($e_{k+1}$) in the current control cycle and the control parameters ($K_p$ and $K_i$), the decision engine 615 can determine the percent change in request per second per server in the current control cycle ($u_{k+1}$). Suppose the total request per second coming in to the system was 5000, then the request per second per server was 250 (i.e., 5000/20). Suppose, the percent change in request per second per server in the current control cycle determined based on equation (4) is +10% ($u_{k\pm1}$=+10%). Then, the request per second per server is 275 (i.e., 250+10% of 250). The decision engine 615 can then determine the required capacity to meet the CPU utilization target of 50% and to process 275 RPS per server to be 18 (i.e., 5000/275~18). As the current capacity is 20 servers and the required capacity is 18 servers, the decision engine 615 can determine that 2 of the active servers can be turned down for energy savings, without compromising latency. The decision engine 615 would then repeat the same process during the next control cycle.

The server state manager 620 can receive the output from the decision engine 615 and in response can adjust the current capacity to meet the required capacity by turning down active servers if the current capacity is greater than the required capacity or turning up additional servers if the current capacity is lower than the required capacity. In the above example, the server state manager 620 can place the two surplus active servers in hot standby or cold standby or even loan them out to other applications that are not latency-sensitive, so that only 18 of the servers remain active in the cluster.

In some embodiments, the decision engine 615 can also determine how many of the inactive servers should be placed in hot standby. The buffer size for the number of servers in hot standby can be determined by the decision engine 615 based on the current trend of workload changes. In some embodiments, the decision engine 615 can estimate the total load (RPS) based on an estimate of time it takes for a server in cold standby to transition into hot standby. The estimate depends on whether the server is powered off, in deep sleep or being used for asynchronous jobs. For example, if the server is in deep sleep, the estimate will be the time required to wake up the server. Similarly, if the server is running asynchronous jobs, the estimate will be the time required to quit the job, clean up and get ready to accept traffic. Suppose the time estimate is 2 minutes. The decision engine 615 can then estimate the total load 2 minutes into the future and translate the estimated total load to the number of servers to be turned on. The inactive server state manager 625 can use the buffer size determined by the decision engine to allocate or deallocate one or more inactive servers to or from hot standby to maintain the buffer size requirement on inactive servers on hot standby.

In some embodiments, the centralized controller 605 can include a power consumption calculator 630 that can determine the average power consumption for a cluster during the last control cycle using the following formula:

$$P_{Total}(k) = \sum_{i}^{N} P_i(k) \quad (6)$$

In some embodiments, the centralized controller 605 can be coupled to one or more database tables. For example, the historical resource usage data can be stored in the database table 635 to enable the centralized controller 605 to retrieve historical resource usage data for use in determining the optimal number of active servers. Although not shown, the centralized controller 605 can also access other database tables to store and/or retrieve power consumption data, control parameters, modeling data, other logged data, and/or the like.

Figure 7:
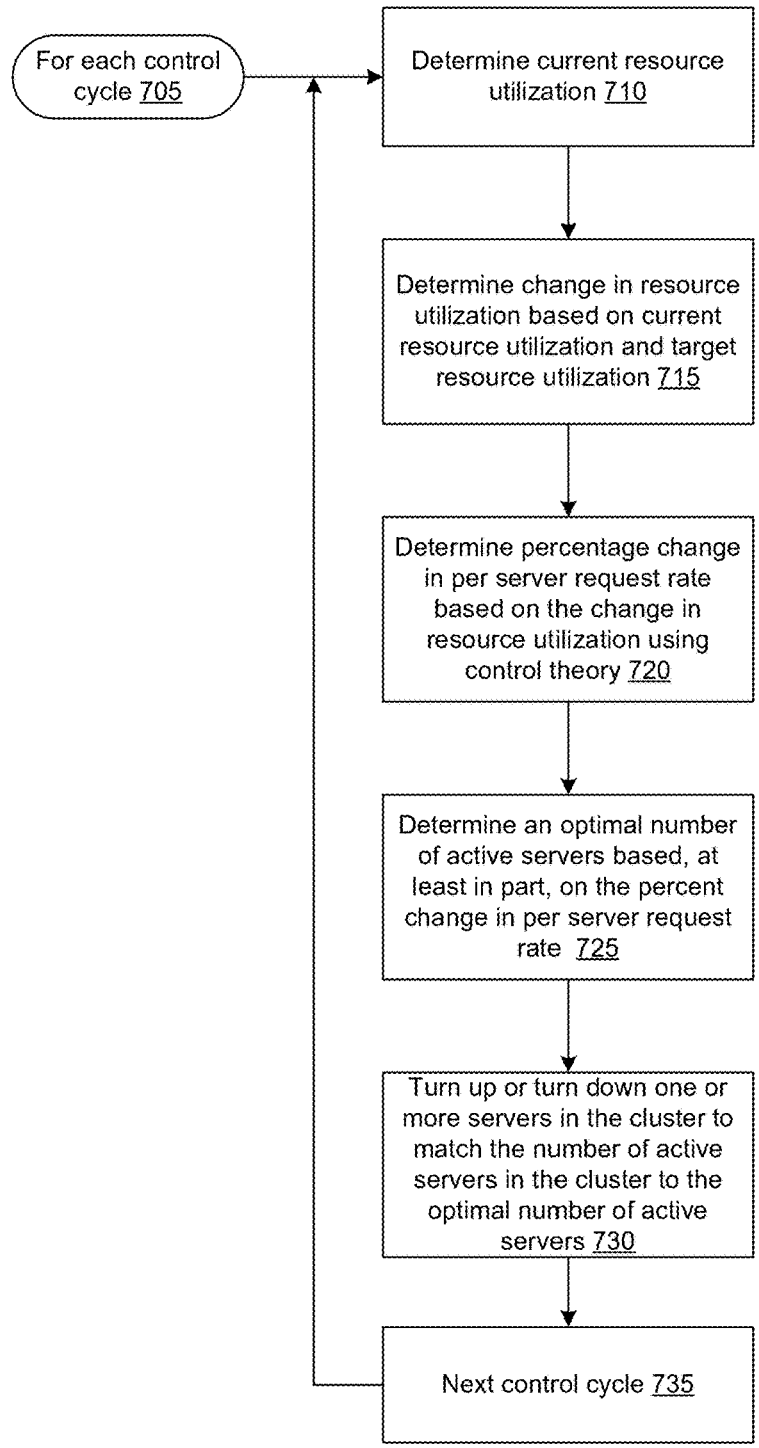
FIG. 7 is a logic flow diagram illustrating an example method of determining an optimal number of active servers by a centralized controller of a self-adaptive control system for dynamic server capacity management.

FIG. 7 is a logic flow diagram illustrating an example method of determining an optimal number of active servers by a centralized controller of a self-adaptive control system for dynamic server capacity management.

The example method starts at block 705 at the beginning of a control cycle. At block 710, a centralized controller (e.g., centralized controller 605 of FIG. 6) determines the current resource utilization for a server cluster. The centralized controller can make that determination by querying the active servers in the cluster for current resource utilization information such as response times or latency, CPU utilization, etc. Each active server in the cluster includes a resource utilization monitor to measure the resource utilization metrics. At block 715, the centralized controller determines a change in the resource utilization based on the current resource utilization and a target resource utilization. At block 720, the centralized controller determines a percent change in per server request rate (e.g., RPS) based at least in part on the change in resource utilization and control theory (e.g., PI or PID control theory). For example, equation (4) described above can be used to determine the change in per server request rate. At block 725, the centralized controller determines an optimal number of active servers based, at least in part, on the percent change in per server request rate. At block 730, the centralized controllers issues commands to turn up or turn down one or more servers in the cluster in order to increase or decrease the current number of active servers to match the optimal number of active servers. A load balancer would then route traffic to the active servers using a load balancing method. The centralized controller would then repeat the process in the next control cycle 735. In this manner, the centralized controller can continuously adjust the active server pool size to adapt to changes in request rates and system and application behavior.

Figure 9:
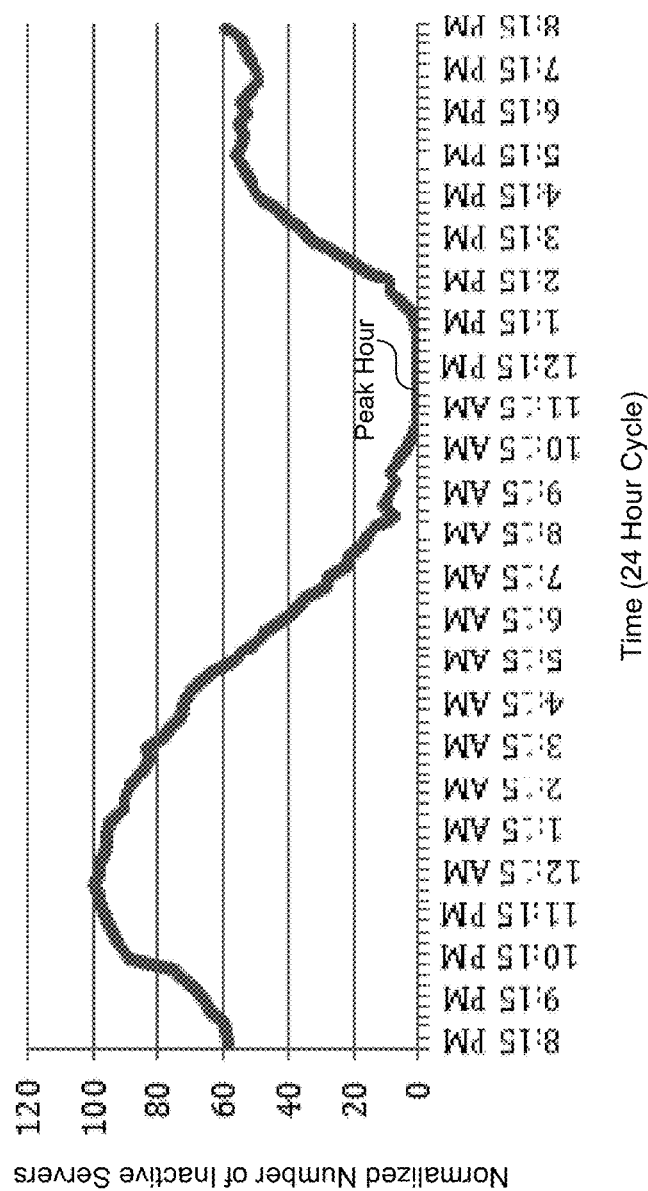
FIG. 9 is a graphical diagram illustrating a normalized number of idle servers in a 24-hour window for an example server cluster deploying a centralized controller of a self-adaptive control system for dynamic server capacity management.

FIG. 9 is a graphical diagram illustrating a normalized number of idle servers in a 24-hour window for an example server cluster deploying a centralized controller of a self-adaptive control system for dynamic server capacity management. In the example cluster, the inactive servers are left running idle (i.e., powered on but receiving no traffic). Those inactive servers can also be put into deep-sleep modes or even powered off to provide more energy savings. Nonetheless, as shown in FIG. 9, leaving inactive servers idle results in significant energy savings. In FIG. 9, the y-axis is the normalized number of servers put into inactive mode during a 24 hour cycle and the x-axis is time. The numbers are normalized by the maximum number of idle servers which occurred around the peak hour for the cluster (e.g., noon). In this example, none of the servers in the cluster could be put into power-saving mode around noon. However, at other times, the centralized controller can place as many as 100 additional servers into inactive mode, providing significant energy savings.

Figure 10:
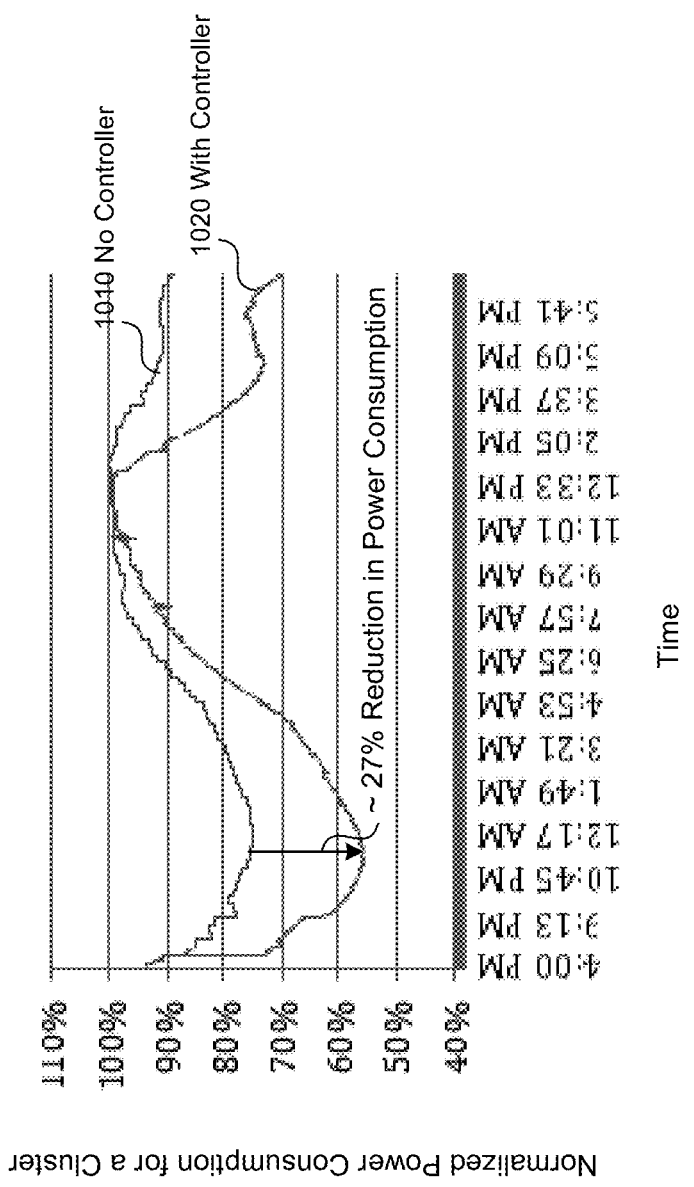
FIG. 10 is a graphical diagram illustrating normalized power consumption for an example server cluster with and without a centralized controller of a self-adaptive control system for dynamic server capacity management.

FIG. 10 is a graphical diagram illustrating normalized power consumption for an example server cluster with and without a centralized controller of a self-adaptive control system for dynamic server capacity management. In FIG. 10, the y-axis is the normalized power consumption relative to the daily maximum power draw and the x-axis is time. The line with reference numeral 1010 is the base case without the centralized controller and the line with reference numeral 1020 shows the power draw with the centralized controller. From FIG. 10, it can be seen that with the centralized controller, the cluster uses about 27% less power around midnight. As expected, the power saving is 0% around peak hours for the cluster (e.g., during noon time). The average power saving over a 24 hour cycle can be about 10-15% for different clusters. In a system with a large number of clusters, the above result can mean a significant amount of energy saved.

Figure 11:
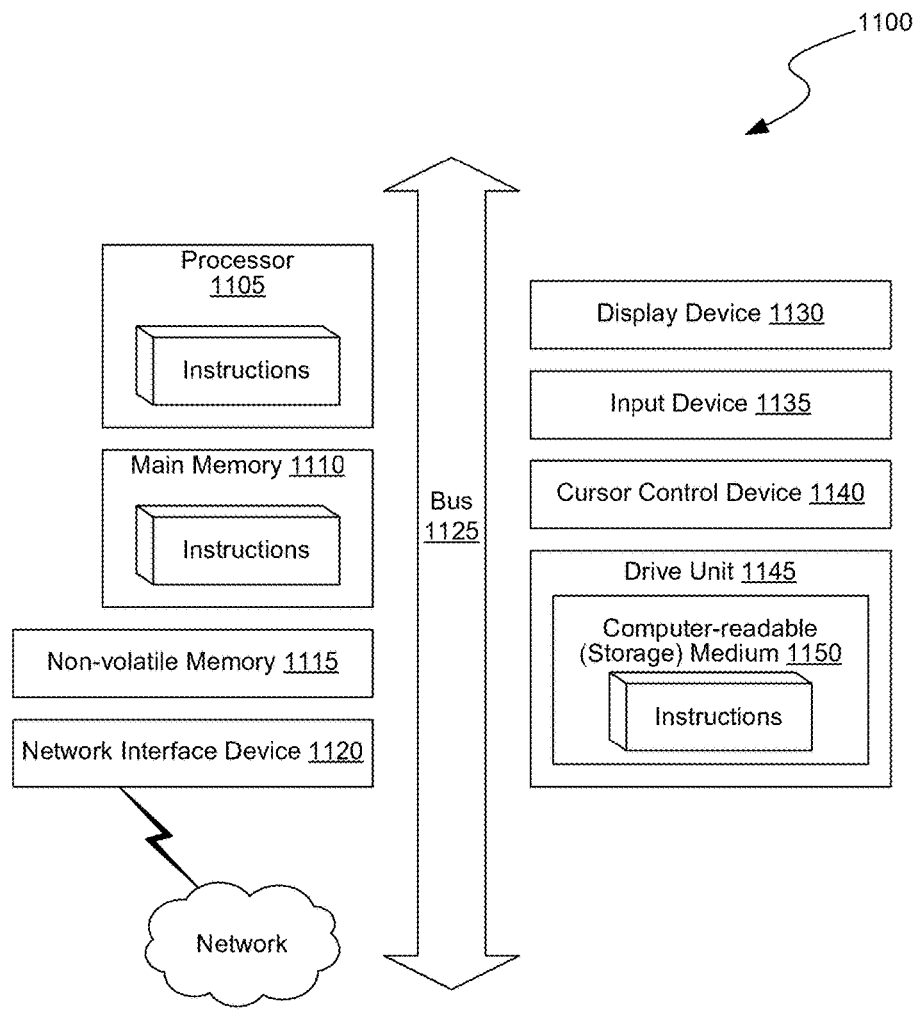
FIG. 11 shows a diagrammatic representation of a computer system within which a set of instructions, for causing the computer system to perform any one or more of the methodologies discussed herein, can be executed.

FIG. 11 shows a diagrammatic representation of a computer system within which a set of instructions, for causing the computer system to perform any one or more of the methodologies discussed herein, can be executed. For example, the centralized controller (e.g., 505, 605), servers in the cluster and the load balancing system (e.g., 110) can be implemented on the computer system 1100.

The computer system 1100 generally includes a processor 1105, main memory 1110, non-volatile memory 1115, and a network interface device 1120. Various common components (e.g., cache memory) are omitted for illustrative simplicity. The computer system 1100 is intended to illustrate a hardware device on which any of the components depicted in the example of FIGS. 1-6 (and any other components described in this specification) and methods described in the example of FIG. 7 can be implemented. The computer system 1100 be of any applicable known or convenient type.

The components of the computer system 1100 can be coupled together via a bus 1125 or through some other known or convenient device.

The processor 1105 may be, for example, a conventional microprocessor such as an Intel Pentium microprocessor or Motorola power PC microprocessor. One of skill in the relevant art will recognize that the terms "computer system-readable (storage) medium" or "computer-readable (storage) medium" include any type of device that is accessible by the processor.

The memory 1110 is coupled to the processor 1105 by, for example, a bus 1125 such as a PCI bus, SCSI bus, or the like. The memory 1110 can include, by way of example but not limitation, random access memory (RAM), such as dynamic RAM (DRAM) and static RAM (SRAM). The memory 1110 can be local, remote, or distributed.

The bus 1125 also couples the processor 1105 to the non-volatile memory 1115 and drive unit. The non-volatile memory 1115 is often a magnetic floppy or hard disk, a magnetic-optical disk, an optical disk, a read-only memory (ROM), such as a CD-ROM, EPROM, or EEPROM, a magnetic or optical card, SD card, or another form of storage for large amounts of data. Some of this data is often written, by a direct memory access process, into memory during execution of software in the computer system 1100. The non-volatile memory 1115 can be local, remote, or distributed. The non-volatile memory can be optional because systems can be created with all applicable data available in memory. A typical computer system will usually include at least a processor, memory, and a device (e.g., a bus) coupling the memory to the processor.

Software is typically stored in the non-volatile memory 1115 and/or the drive unit 1145. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory 1110 in this disclosure. Even when software is moved to the memory for execution, the processor will typically make use of hardware registers to store values associated with the software, and local cache. Ideally, this serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus 1125 also couples the processor to the network interface device 1120. The interface can include one or more of a modem or network interface. It will be appreciated that a modem or network interface can be considered to be part of the computer system 1100. The interface can include an analog modem, isdn modem, cable modem, token ring interface, satellite transmission interface (e.g., "direct PC"), or other interfaces for coupling a computer system to other computer systems. The interface can include one or more input and/or output devices 1135. The I/O devices can include, by way of example but not limitation, a keyboard, a mouse or other pointing device, disk drives, printers, a scanner, speaker, DVD/CD-ROM drives, disk drives, and other input and/or output devices, including a display device. The display device 1130 can include, by way of example but not limitation, a cathode ray tube (CRT), liquid crystal display (LCD), LED display, a projected display (such as a heads-up display device), a touchscreen or some other applicable known or convenient display device. The display device 1130 can be used to display text and graphics. For simplicity, it is assumed that controllers of any devices not depicted in the example of FIG. 8 reside in the interface.

In operation, the computer system 1100 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile memory 1115 and/or drive unit 1145 and causes the processor to execute the various acts required by the operating system to input and output data and to store data in the memory, including storing files on the non-volatile memory 1115 and/or drive unit 1145.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device that manipulates and transforms data represented as physical (electronic) quantities within the computer system's registers and memories into other data similarly represented as physical quantities within the computer system memories or registers or other such information storage, transmission, or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the computer system operates as a standalone device or may be connected (e.g., networked) to other computer systems. In a networked deployment, the computer system may operate in the capacity of a server or a client computer system in a client-server network environment, or as a peer computer system in a peer-to-peer (or distributed) network environment.

The computer system may be a server computer (e.g., a database server), a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any computer system capable of executing a set of instructions (sequential or otherwise) that specify actions to be taken by that computer system.

While the computer system-readable medium or computer system-readable storage medium 1150 is shown in an exemplary embodiment to be a single medium, the term "computer system-readable medium" and "computer system-readable storage medium" should be taken to include a single medium or multiple media (e.g., a centralized or distributed database, and/or associated caches and servers) that store the one or more sets of instructions. The term "computer system-readable medium" and "computer system-readable storage medium" shall also be taken to include any medium that is capable of storing, encoding or carrying a set of instructions for execution by the computer system and that cause the computer system to perform any one or more of the methodologies of the presently disclosed technique and innovation.

In general, the routines executed to implement the embodiments of the disclosure, may be implemented as part of an operating system or a specific application, component, program, object, module, or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of computer system or computer-readable media used to actually effect the distribution.

Further examples of computer system-readable storage media, computer system-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), SD cards, among others.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

From the foregoing, it will be appreciated that specific embodiments have been described herein for purposes of illustration, but that various modifications may be made without deviating from the spirit and scope of the embodiments. Accordingly, the embodiments not limited except as by the appended claims.

What is claimed is:

1. A computer-implemented method, comprising:
   determining, by a controller, a current resource utilization of a server pool, wherein the server pool includes a current number of active servers and a set of inactive servers, wherein the current resource utilization depends on a resource utilization of the current number of active servers;
   determining, by the controller, a total request rate of the server pool;
   determining, using a feedback controller of a centralized controller, a change in per server request rate so as to enable the current resource utilization to approach a target resource utilization of the server pool, wherein the change in the per server request rate is determined based at least in part on the current resource utilization and a value of the per server request rate in a previous control cycle of the feedback controller;
   determining, by the controller, based at least in part on the change in per server request rate and the total request rate, a required number of active servers in the server pool;
   adjusting, by the controller, based on the required number of active servers, the current number of active servers in the server pool to the required number of active servers, the adjusting including increasing or decreasing the current number of active servers; and
   distributing, by a load balancer, incoming requests among the required number of active servers in the server pool.

2. The computer-implemented method of claim 1, wherein the resource utilization includes one or more of CPU utilization or latency.

3. The computer-implemented method of claim 1, wherein determining the current resource utilization includes:
   obtaining, by the controller, the resource utilization of each of the current number of active servers, and
   aggregating, by the controller, the resource utilization of the each of the current number of active servers to generate the current resource utilization of the server pool.

4. The computer-implemented method of claim 1, wherein determining the total request rate includes:
   obtaining, by the controller, a request rate of each of the current number of active servers, and
   aggregating, by the controller, the request rate of the each of the current number of active servers to generate the total request rate of the server pool.

5. The computer-implemented method of claim 1, wherein determining the change in per server request rate includes determining the change in per server request rate further based on control parameters in the previous control cycle of the feedback controller, the feedback controller being a proportional-integral (PI) controller and the control parameters including a proportional gain and an integral gain.

6. The computer-implemented method of claim 1, wherein determining the change in per server request rate includes determining the change in per server request rate further based on control parameters in the previous control cycle of the feedback controller, the feedback controller being a proportional-integral-derivative (PID) controller and the control parameters including a proportional gain, an integral gain and a derivative gain.

7. The computer-implemented method of claim 1, wherein adjusting the current number of active servers in the server pool includes:

determining that the current number of active servers in the server pool is greater than the required number of active servers, and scaling down the current number of active servers in the server pool by transitioning a number of active servers in the server pool into inactive servers so that the adjusted number of active servers in the server pool matches the required number of active servers.

8. The computer-implemented method of claim 1, wherein adjusting the current number of active servers in the server pool includes:

determining that the current number of active servers in the server pool is smaller than the required number of active servers; and scaling up the current number of active servers in the server pool by transitioning a number of inactive servers in the server pool into active servers so that the adjusted number of active servers in the server pool matches the required number of active servers.

9. The computer-implemented method of claim 1, wherein an inactive server of the set of inactive servers accepts no request traffic and is placed in an idle state, a powered off state, a deep sleep state or used for processing asynchronous jobs.

10. The computer-implemented method of claim 9 further comprising:

maintaining a number of the inactive servers in the server pool in an idle state so that the inactive servers in the idle state can be transitioned into active servers without delay, wherein the number of the inactive servers to be maintained in the idle state is determined based on a historical trend of request rates.

11. The computer-implemented method of claim 1, wherein the required number of active servers is determined for every control cycle of the feedback controller.

12. The computer-implemented method of claim 1, wherein the feedback controller is configured to determine the change in per server request rate using control parameters, the control parameters including:

a measured process variable parameter that is determined based on the current resource utilization as, a control variable that is determined based on a percentage change in per server request rate, an internal control signal that is determined based on a change in active server pool size, and an error signal that is determined based on a difference of the current resource utilization and the target resource utilization.

13. A computer-readable storage medium storing computer-readable instructions, comprising:

instructions for determining a current resource utilization of a server pool, wherein the server pool includes a current number of active servers and a set of inactive servers, wherein the current resource utilization depends on a resource utilization of the current number of active servers;

instructions for determining a total request rate of the server pool;

instructions for determining, using a feedback controller, a change in per server request rate so as to enable the current resource utilization to approach a target resource utilization of the server pool, wherein the change in the per server request rate is determined based at least in part on the current resource utilization and a value of the per server request rate in a previous control cycle of the feedback controller;

instructions for determining based at least in part on the change in per server request rate and the total request rate, a required number of active servers in the server pool;

instructions for adjusting, by the centralized controller, based on the required number of active servers, the current number of active servers in the server pool to the required number of active servers; and instructions for distributing, by a load balancer, incoming requests among the required number of active servers in the server pool.

14. The computer-readable storage medium of claim 13, wherein the resource utilization includes one or more of CPU utilization or latency.

15. The computer-readable storage medium of claim 1, wherein the instructions for adjusting the current number of active servers in the server pool includes:

instructions for transitioning a number of active servers in the server pool into inactive servers so that the current number of active servers in the server pool matches the required number of active servers in an event the current number of active servers is greater than the required number of active servers, or instructions for transitioning a number of inactive servers in the server pool into active servers so that the current number of active servers in the server pool matches the required number of active servers in an event the current number of active servers is smaller than the required number of active servers.

16. A system, comprising:

a processor and memory; and a controller deployed in a server pool, the controller configured to periodically:

determine a current resource utilization of the server pool, wherein the server pool includes a current number of active servers, wherein the current resource utilization depends on a resource utilization of the current number of active servers, determine a total request rate for the server pool, determine, using a feedback controller, a change in per server request rate so as to enable the current resource utilization to approach a target resource utilization of the server pool, wherein the change in the per server request rate is determined based at least in part on the current resource utilization and a value of the per server request rate in a previous control cycle of the feedback controller, determine, by the controller, based at least in part on the change in per server request rate and the total request rate, a required number of active servers in the server pool, adjust, by the controller, based on the required number of active servers, the current number of active servers in the server pool to the required number of active servers; and a load balancer configured to distribute request traffic among servers that remain in the current number of active servers following adjustment of the current number of active servers.

17. The system of claim 16, wherein the controller is further configured to:

deallocate an amount of servers from the current number of active servers to decrease the current number of active servers to match the required number of active servers in an event the current number of active servers is greater than the required number of active servers, or allocate an amount of servers from an inactive mode to the current number of active servers to increase the current number of active servers to match the required number of active servers in an event the current number of active servers is smaller than the required number of active servers.

* * * * *

UNITED STATES PATENT AND TRADEMARK OFFICE
CERTIFICATE OF CORRECTION

PATENT NO. : 10,212,220 B2  
APPLICATION NO. : 15/493532  
DATED : February 19, 2019  
INVENTOR(S) : Qiang Wu et al.

Page 1 of 1

It is certified that error appears in the above-identified patent and that said Letters Patent is hereby corrected as shown below:

In the Claims

In Column 16, Line 15, Claim 15, delete "of claim 1," and insert -- of claim 13, --, therefor.

Signed and Sealed this
Sixteenth Day of April, 2019

Andrei Iancu
*Director of the United States Patent and Trademark Office*